United States Patent
Hudson et al.

(10) Patent No.: US 11,025,173 B2
(45) Date of Patent: Jun. 1, 2021

(54) VEHICLE POWER CONTROL SYSTEMS

(71) Applicant: Ford Global Technologies, LLC, Dearborn, MI (US)

(72) Inventors: Andrew Hudson, Sterling Heights, MI (US); John Anthony DeMarco, Lake Orion, MI (US); David Celinske, Wolverine Lake, MI (US); Farouq Mozip, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/266,854

(22) Filed: Feb. 4, 2019

(65) Prior Publication Data

US 2021/0067047 A1    Mar. 4, 2021

(51) Int. Cl.
*H02M 3/335* (2006.01)
*H02J 7/34* (2006.01)
*G05F 1/46* (2006.01)
*B60R 16/033* (2006.01)

(52) U.S. Cl.
CPC ....... *H02M 3/33576* (2013.01); *B60R 16/033* (2013.01); *G05F 1/462* (2013.01); *H02J 7/345* (2013.01)

(58) Field of Classification Search
CPC ..... H02M 3/33576; H02J 7/345; G05F 1/462; B60R 16/033
See application file for complete search history.

(56) References Cited

U.S. PATENT DOCUMENTS

| | | | |
|---|---|---|---|
| 5,886,508 A | 3/1999 | Jutras | |
| 8,971,057 B2 | 3/2015 | Smith | |
| 9,211,798 B2 | 12/2015 | Hampo et al. | |
| 9,325,244 B2 * | 4/2016 | Machi | H02M 3/335 |
| 2011/0002445 A1 * | 1/2011 | Hattrup | H02M 7/53873 378/101 |
| 2013/0001006 A1 * | 1/2013 | Gibson | B62D 5/0463 180/446 |

FOREIGN PATENT DOCUMENTS

CN    200987123 Y    12/2007

* cited by examiner

*Primary Examiner* — Adolf D Berhane
*Assistant Examiner* — Afework S Demisse
(74) *Attorney, Agent, or Firm* — Frank Lollo; Eversheds Sutherland (US) LLP

(57) ABSTRACT

Vehicles and vehicle power circuits are disclosed for providing multiple different voltages from the same power source. An example vehicle includes a power source, a plurality of electrical loads, and a power circuit. The power circuit is electrically connected to the power source and the plurality of electrical loads. The power circuit includes a plurality of power segments connected in parallel to the power source, each power segment comprising a DC to DC converter and an ultra capacitor in series with the DC to DC converter, wherein the ultra capacitors of the plurality of power segments are connected in series.

18 Claims, 3 Drawing Sheets

VEHICLE POWER CONTROL SYSTEMS

TECHNICAL FIELD

The present disclosure generally relates to vehicle electronics and, more specifically, circuitry for providing appropriate voltage to multiple loads requiring different voltages in a vehicle.

BACKGROUND

Modern vehicles include many functions and capabilities that require the use of different voltages. For example, some loads may require 12V, while other loads may require 24V or some other voltage. In order to function properly, the vehicle must include the ability to provide the appropriate voltage for each load.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for providing different voltages to different loads without requiring a dedicated high voltage source. An example vehicle includes a power source, a plurality of electrical loads, and a power circuit. The power circuit is electrically connected to the power source and the plurality of electrical loads. The power circuit comprises a plurality of power segments connected in parallel to the power source. Each power segment comprises a DC to DC converter, and an ultra capacitor in series with the DC to DC converter, wherein the ultra capacitors of the plurality of power segments are connected in series.

An example vehicle power circuit includes a power source and a plurality of power segments connected to the power source in parallel. Each power segment comprises a DC to DC converter and an ultra capacitor in series with the DC to DC converter, wherein the ultra capacitors of the plurality of power segments are connected in series.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
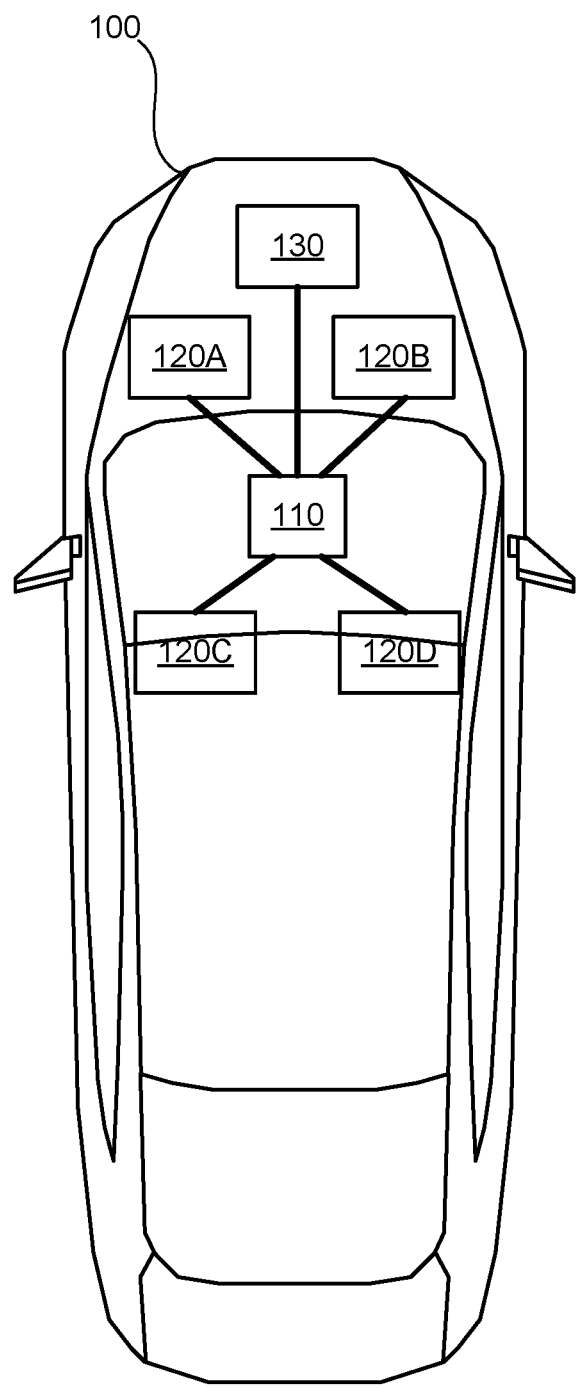
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, modern vehicles may include various functions and capabilities that require varying voltages. Many automotive charging and storage systems contain 12V alternators/DC to DC converters and 12V starting lighting ignition (SLI) batteries. The introduction of high power DC loads in automotive electrical systems place ever-increasing weight and cost burdens on alternators, batteries, and wire harnesses. One potential approach to supporting additional high power loads may be to simply add more 12V alternators/DCDC converters and 12V batteries to the vehicle. However the drawback to this approach is increased cost, size, and weight, as well as various packing constraints. Another approach may be to increase the operating voltage of the high power loads, which in turn decreases the necessary wire size, thereby decreasing cost and weight. This approach may have its own drawbacks as well.

Example embodiments disclosed herein may be configured to enable a split power net to provide both low and high voltages (e.g., 12V, 24V, 36V, and 48V) by using a single series string of batteries or capacitors all charged by a conventional 12V, 24V, 36V, or 48V system.

In some examples, a series of power segments may be used, each including at least a DC to DC converter and a power storage, such as a battery or ultra capacitor. Multiple segments may be connected to a power source in parallel, such that the same power source can charge each power storage. In addition, the power storages may be connected in series, in a cascading manner, such that the output voltage of the segments add together depending on where in the circuit the output is connected to. This enables loads requiring various voltages to be connected to the output of the segments, and a single power source voltage can be used to supply all the various output voltages.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIGS. 2 and 3).

As shown in FIG. 1, vehicle 100 may include a power circuit 110, a plurality of electrical loads 120A-D, and a power source 130.

The power circuit 110 will be described in greater detail below with respect to FIGS. 2 and 3. The plurality of electrical loads 120A-D may be any electrical loads that can be included in a vehicle. For example, this may include various lights, windows, radio, heating and cooling systems, and more. Each load may require a nominal operating voltage. Where two loads require different operating voltages, it may be beneficial to provide those operating voltages in a compact manner. Embodiments herein may enable the vehicle to provide the proper operating voltage to each load while using the same power source (i.e., without requiring a separate power source for each voltage level required). The power source 130 may include a vehicle battery (e.g., 12V lead acid battery) and/or a vehicle alternator.

Figure 2:
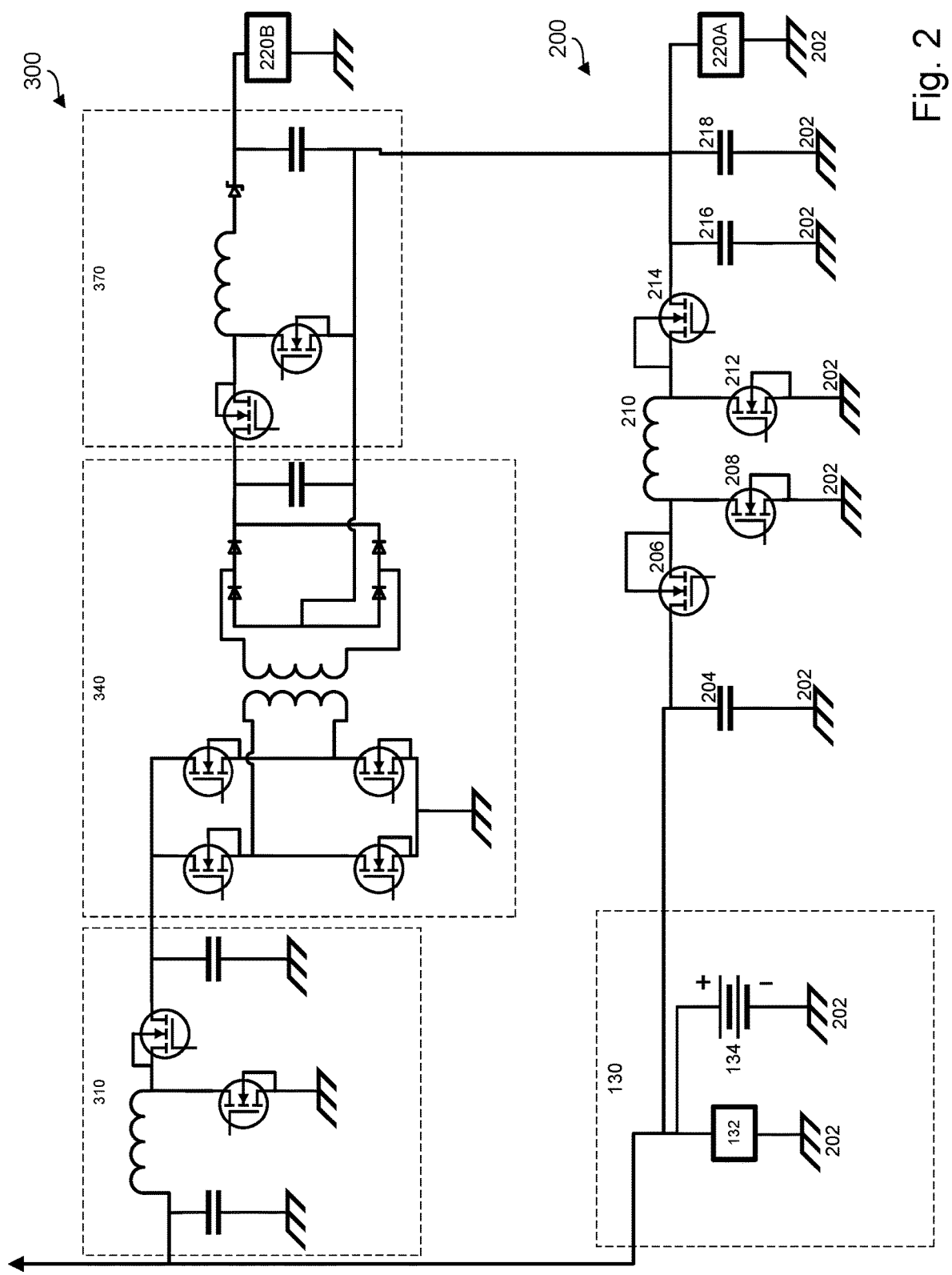
FIG. 2 illustrates an example circuit diagram of an example vehicle power circuit according to embodiments of the present disclosure.

FIG. 2 illustrates an example expanded view of the power circuit 110. The power circuit may include the power source 130, a first segment 200, a second segment 300, a first load 220A, and a second load 220B. The power circuit may also include one or more additional segments that are similar or identical to the second segment 300, positioned on top of the second segment 300 shown in FIG. 2.

Regarding the power source 130, as noted above the power source 130 may include an alternator 132 and/or a vehicle battery 134. Each of the alternator 132 and/or vehicle battery 134 may be configured to provide a 12V nominal output. The power source thus can be used to provide power for charging the various segments 200, 300, and any additional power segments included in the circuit. Power source 130 may also be electrically connected to the chassis ground 202.

Each segment 200, 300, etc. may be configured to provide a 12V nominal output. The arrangement and connection between the segments may enable the output to be stacked or added together, so as to provide multiples of the nominal 12V output.

As shown in FIGS. 2, segments 200 and 300 may be connected in parallel to the power source 130. Each segment may be independently charged via a dedicated DC to DC converter, which may take as an input the voltage from the power source and have an output that is a higher voltage.

As shown in FIG. 2, first segment 200 may include a DC to DC converter. As illustrated, the DC to DC converter of first segment 200 is a buck-boost converter, although it should be understood that other types of converters may be used as well. A buck-boost style converter may be selected in this instance because the first segment 200 is referenced to the chassis ground 202.

The buck-boost converter may include capacitors 204 and 216, transistors 206, 208, 212, and 214, and inductor 210. The values of these components may be any amount such that the nominal output is 12V.

In other embodiments, the voltage of each stage may be another value instead of 12V. In these cases, the values of the various components may be selected such that a different nominal output voltage is achieved. Each segment in the power circuit may be configured to provide the same nominal output voltage, such that when a load is coupled to a given segment the voltage seen by the load is the voltage of the given segment and all downstream segments, resulting in a multiple of the nominal voltage of the first segment 200.

First segment 200 also includes an ultra capacitor 218. The ultra capacitor 218 may provide a high power density while having a low energy density. This may be beneficial in certain instances where the load requires a high power density for short durations. Alternatively, ultra capacitor 218 may instead be a battery or other power storage medium, such as a lead-acid or lithium-ion battery. A battery may be selected where the load is better suited for a high energy density but low power density arrangement. This may be particularly useful where the load requires a steady current for a relatively long duration.

Ultra capacitor 218 may also be known as a supercapacitor. The ultra capacitor in FIG. 218 may provide a nominal voltage of 12V between a positive end of the ultra capacitor 218 (i.e., the top side as shown) and the chassis ground 202. The load 220A may be coupled between the ultra capacitor 218 and the chassis ground. As such, load 220A may be any electrical vehicle load requiring a nominal 12V to operate.

The second power segment 300 may be referenced to an artificial grounding point equivalent to the positive end of the first segment, rather than the chassis ground 202. Similarly, a third power segment (not shown) may be similar or identical to the second power segment 300, and may be referenced to a positive end of the second segment 300. And each successive additional power segment may be referenced to a positive end of the segment below. As such, a nominal voltage between the positive end of the second segment 300 and the chassis ground may be 24V (i.e., the combined voltage of the first and second segments), while the nominal voltage between the positive end of the third segment and the chassis ground is 36V (i.e., the combined voltage of the first, second, and third segments), and so on.

Figure 3:
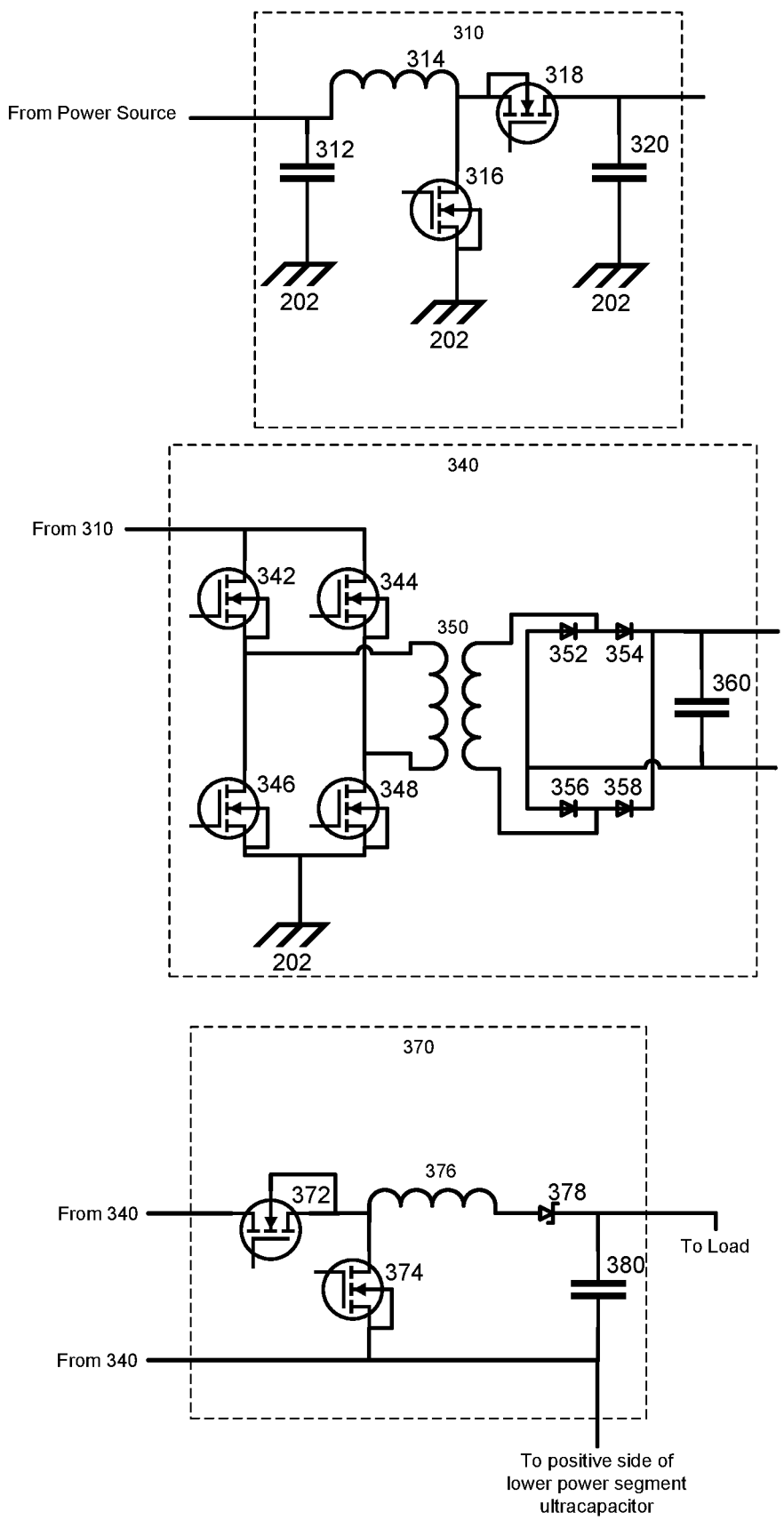
FIG. 3 illustrates an expanded view of some parts of the circuit shown in FIG. 2.

The second power segment 300 is shown expanded in FIG. 3. It should be understood that each successive power segment coupled upstream from the chassis ground 202 may be similar or identical to power segment 300.

The second power segment 300 is illustrated with three stages including an initial boost stage 310, an isolation stage 340, and a charge control stage 370. The initial boost stage 310 may include a first DC to DC converter. As illustrated in FIGS. 2 and 3, the first DC to DC converter may be a simple boost converter, including capacitors 312 and 320, inductor 314, and transistors 316 and 318. The first DC to DC converter may convert DC voltage from the power source 130 to a higher DC voltage (e.g., from 12V input to 60V output).

The second power segment 300 may also include a power factor correction stage. The power factor correction stage may be positioned between the initial boost stage and the isolation stage.

In some examples all power segments may include the same type of DC to DC converter in the boost stage (e.g., buck-boost, boost, etc.). In other examples, the first segment 200 may include a first type of DC to DC converter (e.g., buck-boost), while the second power segment 300 and/or all other power segments may include a second, different type of DC to DC converter (e.g., boost). Each of the DC to DC converters may be independent from each other.

Isolation stage 340 may converts an output DC voltage from the boost stage 310 into an AC voltage. This may be done using a full H-bridge configuration of transistors (342, 344, 346, and 348) as shown in FIGS. 2 and 3. Alternatively, one or more other circuit elements may be used to convert the DC voltage from the initial boost stage 310 into an AC voltage.

Isolation stage 340 may also include an isolation transformer 350. The transformer 350 in FIGS. 2 and 3 may be a 1:1 transformer having a primary coil and a secondary coil. The transformer may transfer the AC from the primary coil to the secondary coil.

Isolation stage 340 may also include a rectifier, which may convert the AC voltage from the secondary coil of the transformer 350 into DC voltage. As shown in FIGS. 2 and 3, the rectifier comprises a full bridge rectifier including diodes 352, 354, 356, and 358 connected as shown. It should be understood that other types of rectifiers may be used as well. Isolation stage 340 may also include a smoothing capacitor 360.

The charge control stage 370 may include a second DC to DC converter (e.g., buck converter) and control loop (i.e., transistors 372, 374, inductor 376, diode 378), and ultra capacitor 380. The charge control stage 370 may convert a high voltage from the isolation stage into the nominal output voltage of the stage 300 (i.e., 12V referenced to the first stage.

An output of the charge control stage is referenced between the positive side of the ultra capacitor 380. The negative side of the ultra capacitor 380 is connected to a positive side of the ultra capacitor 218 of power segment 200.

Similarly, a negative side of a third ultra capacitor of a third segment (not shown) is connected to the positive side of the ultra capacitor 380.

As such, the ultra capacitors of the first, second, and any additional power stages are connected in series with each other, ultimately such that the voltage output of the power segments stack or add together with respect to the chassis ground.

This arrangement may be referred to as a tiered or cascade arrangement of the power segments. In addition, the first segment 200 may be referred to as being downstream from the second segment 300, which refers to the fact that the first segment is coupled to the chassis ground. Upstream may refer to a segment having an ultra capacitor that is further removed from the chassis ground 202.

The voltage between a given power segment or target power segment and the chassis ground 202 is the voltage between the positive side of the respective ultra capacitor of that segment and the chassis ground. Thus, the output voltage of a given segment between the positive side of the corresponding ultra capacitor and the chassis ground is the combined voltage of the target power segment plus all downstream power segments.

In some examples, the power circuit may include first, second, third, and fourth power segments. The nominal outputs between the respective ultra capacitors and the chassis ground may thus be 12V, 24V, 36V, and 48V. This output may be due to the fact that the first segment is referenced to the chassis ground, the second segment is referenced to first segment, the third segment is referenced to second segment, and the fourth segment is referenced to third segment. It should be understood that more or fewer segments may be included in the power circuit.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A vehicle comprising:
a power source;
a plurality of electrical loads; and
a power circuit electrically connected to the power source and the plurality of electrical loads, the power circuit comprising:
a first power segment and a second power segment, the first power segment and the second power segment connected in parallel to the power source, the first power segment and the second power segment both comprising:
a boost stage comprising:
a DC to DC converter; and
an ultra capacitor in series with the DC to DC converter; and
an isolation stage comprising:
a DC to AC converter;
a transformer;
a rectifier; and
a smoothing capacitor,
wherein the first power segment is connected to a first electric load of the plurality of electric loads and the second power segment is connected to a second electric load of the plurality of electric loads,
wherein the first power segment provides a first output voltage to the first electric load and the second power segment provides a second output voltage to the second electric load, and
wherein the second output voltage is larger than the first output voltage.

2. The vehicle of claim 1, wherein the power source comprises an alternator.

3. The vehicle of claim 1, wherein each ultra capacitor is charged independently, and wherein each power segment comprises an independent DC to DC converter.

4. The vehicle of claim 1, wherein the first power segment and the second power segment further comprise a charge control stage.

5. The vehicle of claim 4, wherein the DC to DC converter is a first DC to DC converter, and wherein the charge control stage comprises:
a second DC to DC converter;
an inductor; and
the ultra capacitor, and wherein the charge control stage is in series with the isolation stage.

6. The vehicle of claim 1, wherein the first power segment and the second power segment are coupled in a tiered arrangement such that a first power segment is coupled downstream toward ground from a second power segment, wherein:
a voltage output between a target power segment and ground is a combined voltage of the target power segment plus all downstream power segments.

7. The vehicle of claim 1, wherein:
a first power segment is referenced to ground,
a second power segment is referenced to the first power segment, and each successive power segment is referenced to an adjacent downstream power segment.

8. A vehicle power circuit comprising:
a power source; and
a first power segment and a second power segment, the first power segment and the second power segment connected in parallel to the power source, the first power segment and the second power segment both comprising:
a boost stage comprising:
a DC to DC converter; and
an ultra capacitor in series with the DC to DC converter, an isolation stage comprising:
- a DC to AC converter;
- a transformer;
- a rectifier; and
- a smoothing capacitor, wherein the first power segment is connected to a first electric load of the plurality of electric loads and the second power segment is connected to a second electric load of the plurality of electric loads, wherein the first power segment provides a first output voltage to the first electric load and the second power segment provides a second output voltage to the second electric load, and wherein the second output voltage is larger than the first output voltage.

9. The vehicle power circuit of claim 8, wherein the power source comprises an alternator.

10. The vehicle power circuit of claim 8, wherein each ultra capacitor is charged independently, and wherein each power segment comprises an independent DC to DC converter.

11. The vehicle power circuit of claim 8, wherein each DC to DC converter of the first power segment and the second power segment is the same type of converter.

12. The vehicle power circuit of claim 8, wherein a first DC to DC converter of a first power segment is a first type of DC to DC converter, and wherein a second DC to DC converter of a second power segment is a second type of DC to DC converter that is different than the first type of DC to DC converter.

13. The vehicle power circuit of claim 3, wherein the first power segment and the second power segment further comprise a charge control stage.

14. The vehicle power circuit of claim 13, wherein the DC to DC converter is a first DC to DC converter, and wherein the charge control stage comprises:
- a second DC to DC converter;
- an inductor; and
- the ultra capacitor, and wherein the charge control stage is in series with the isolation stage.

15. The vehicle power circuit of claim 8, wherein the first power segment and the second power segment are coupled in a tiered arrangement such that a first power segment is coupled downstream toward ground from a second power segment, wherein:
- a voltage output between a target power segment and ground is a combined voltage of the target power segment plus all downstream power segments.

16. The vehicle power circuit of claim 8, wherein a first power segment is referenced to ground.

17. The vehicle power circuit of claim 16, wherein a second power segment is referenced to the first power segment.

18. The vehicle power circuit of claim 17, wherein a third power segment is referenced to the second power segment, and wherein a fourth power segment is referenced to the third power segment.

* * * * *